July 4, 1967  G. HARRIS  3,329,228
FOLDABLE GASOLINE DRIVEN GOLF CART
Filed Oct. 11, 1965  6 Sheets-Sheet 3
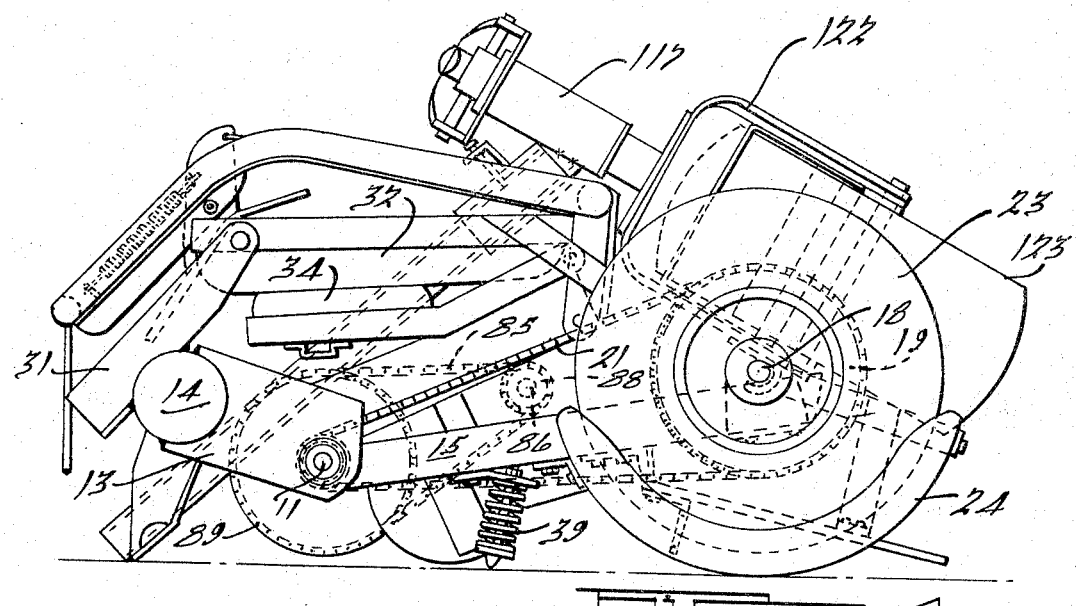
FIG. 4.
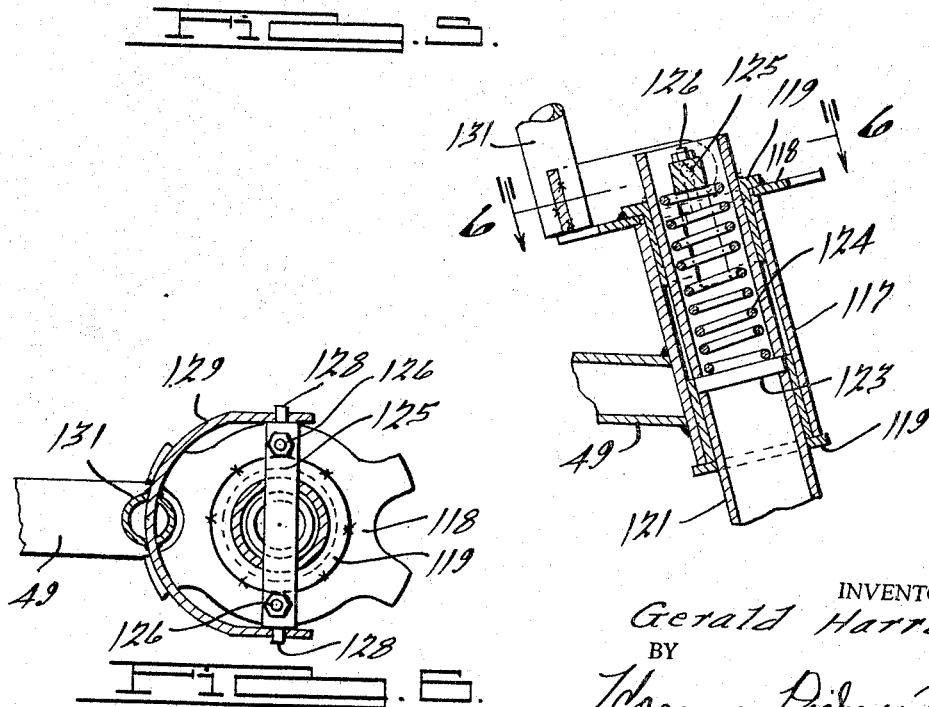
FIG. 5.
FIG. 6.
INVENTOR.
Gerald Harris
BY
Harness, Dickey & Pierce
ATTORNEYS.

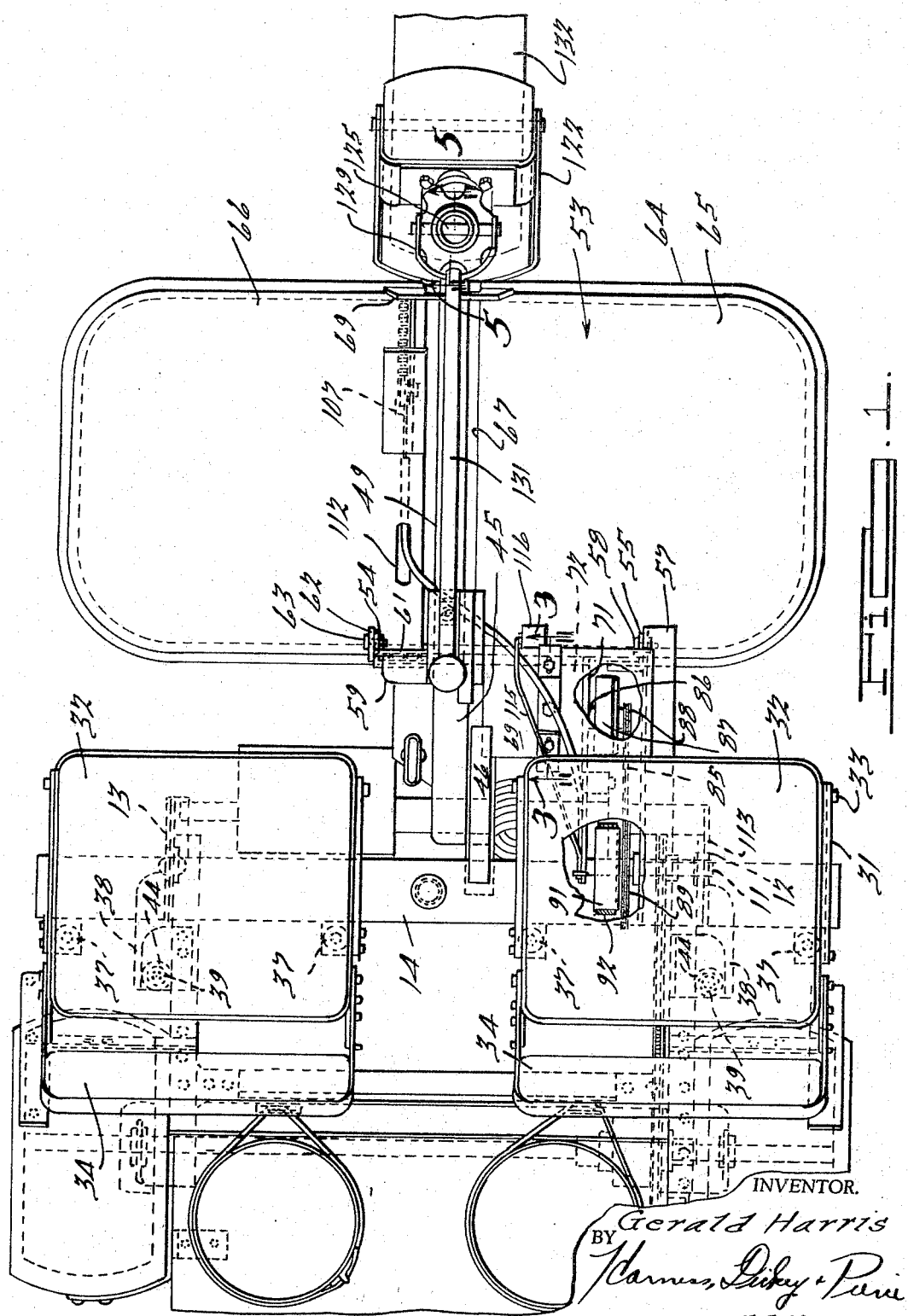

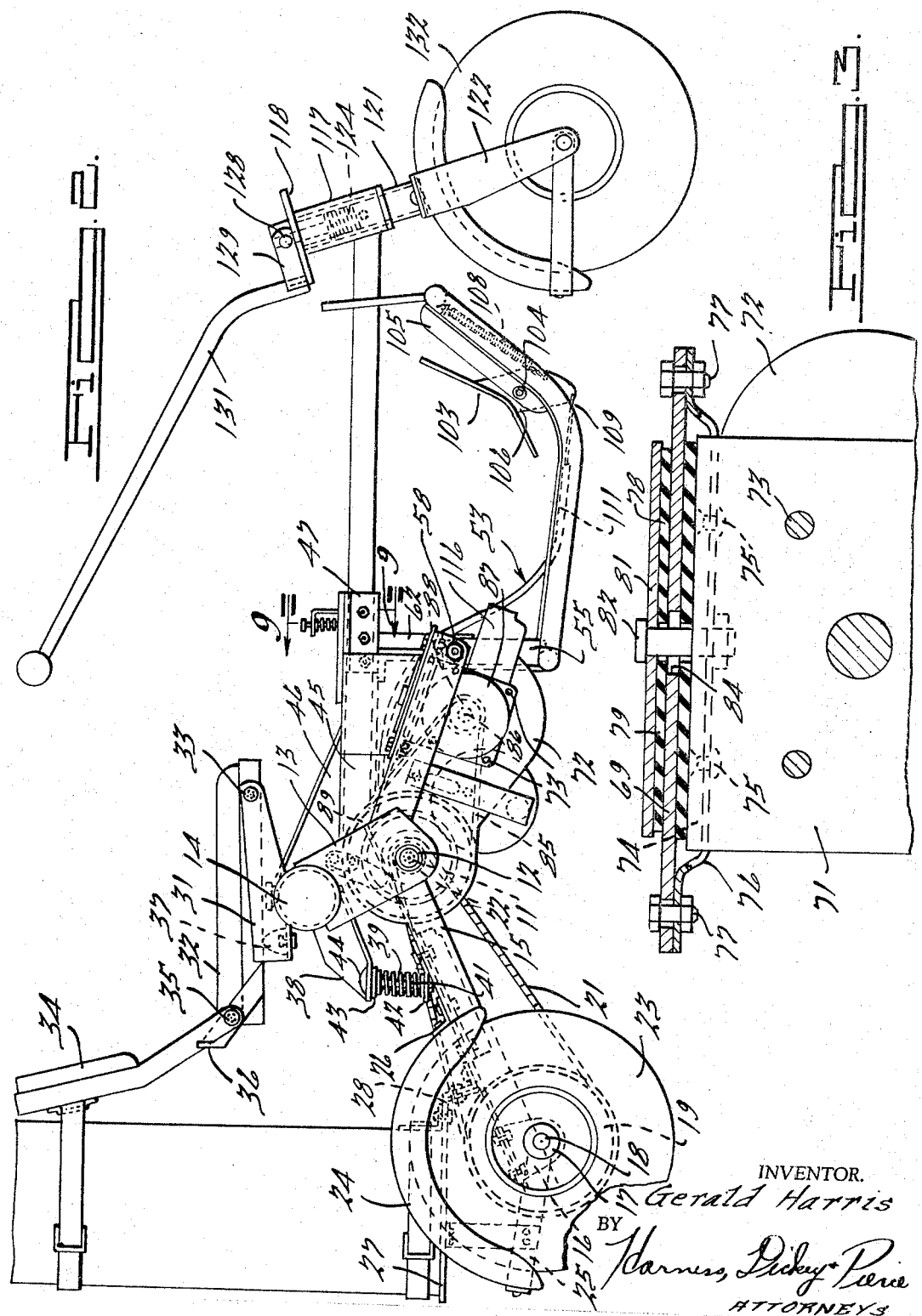

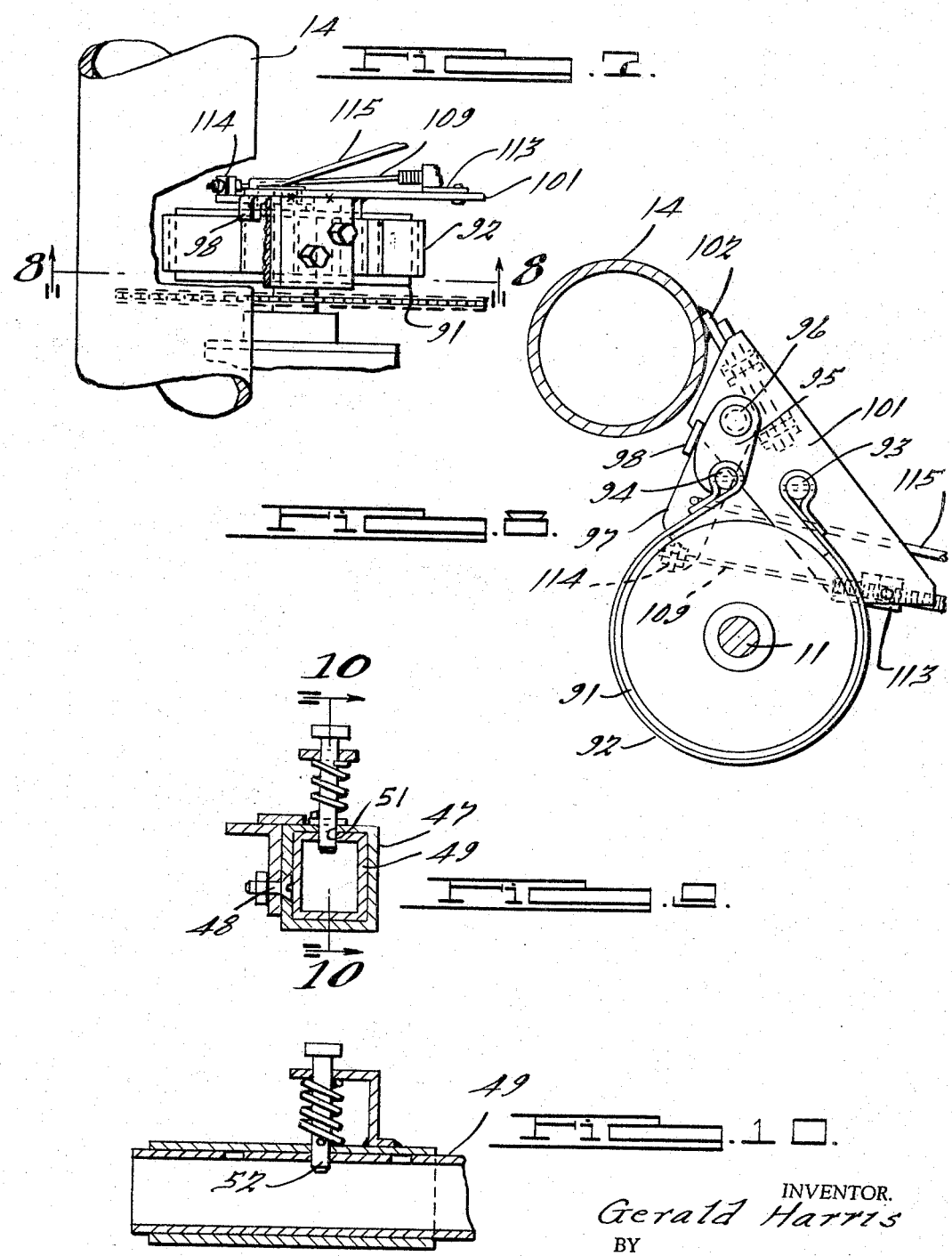

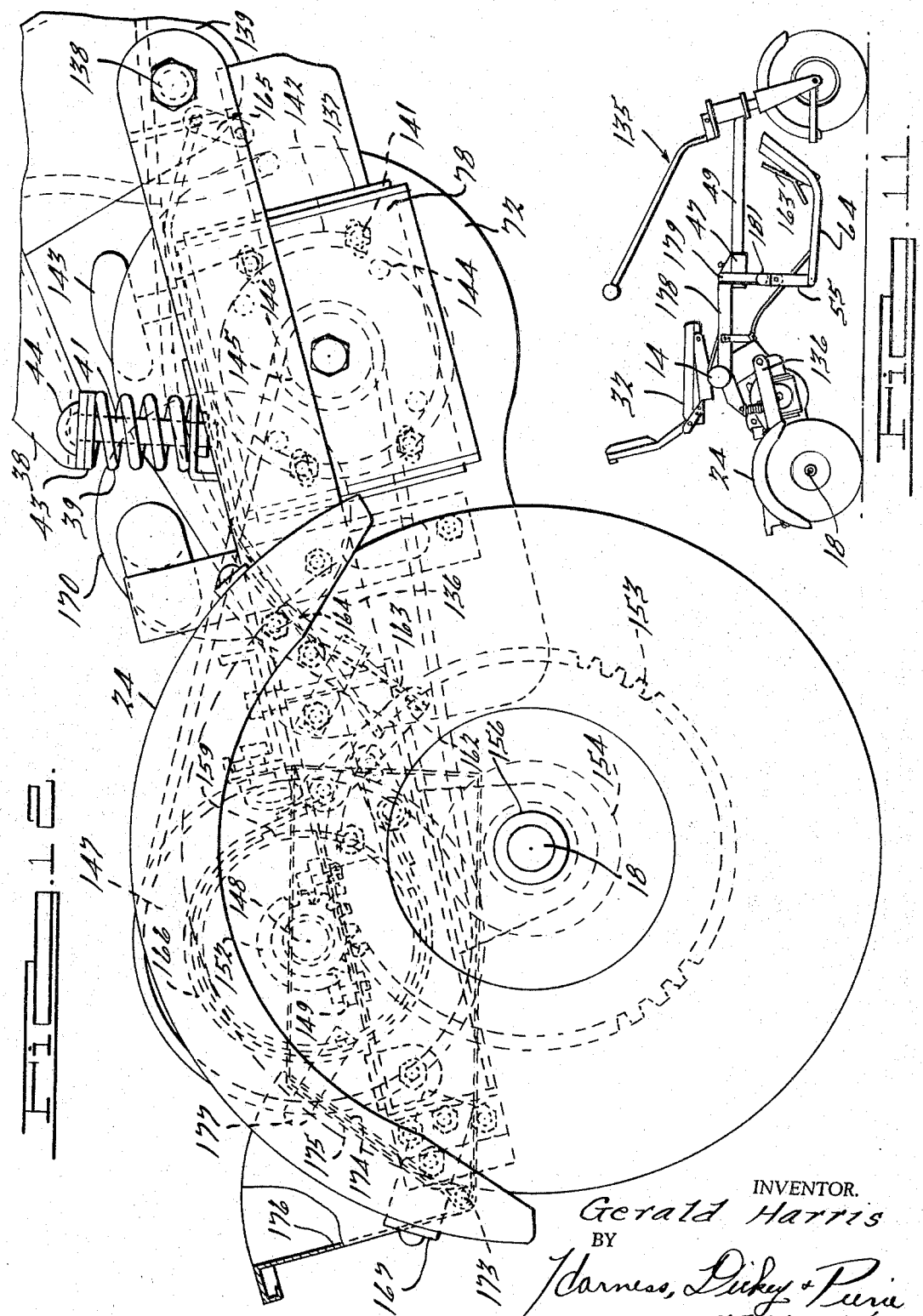

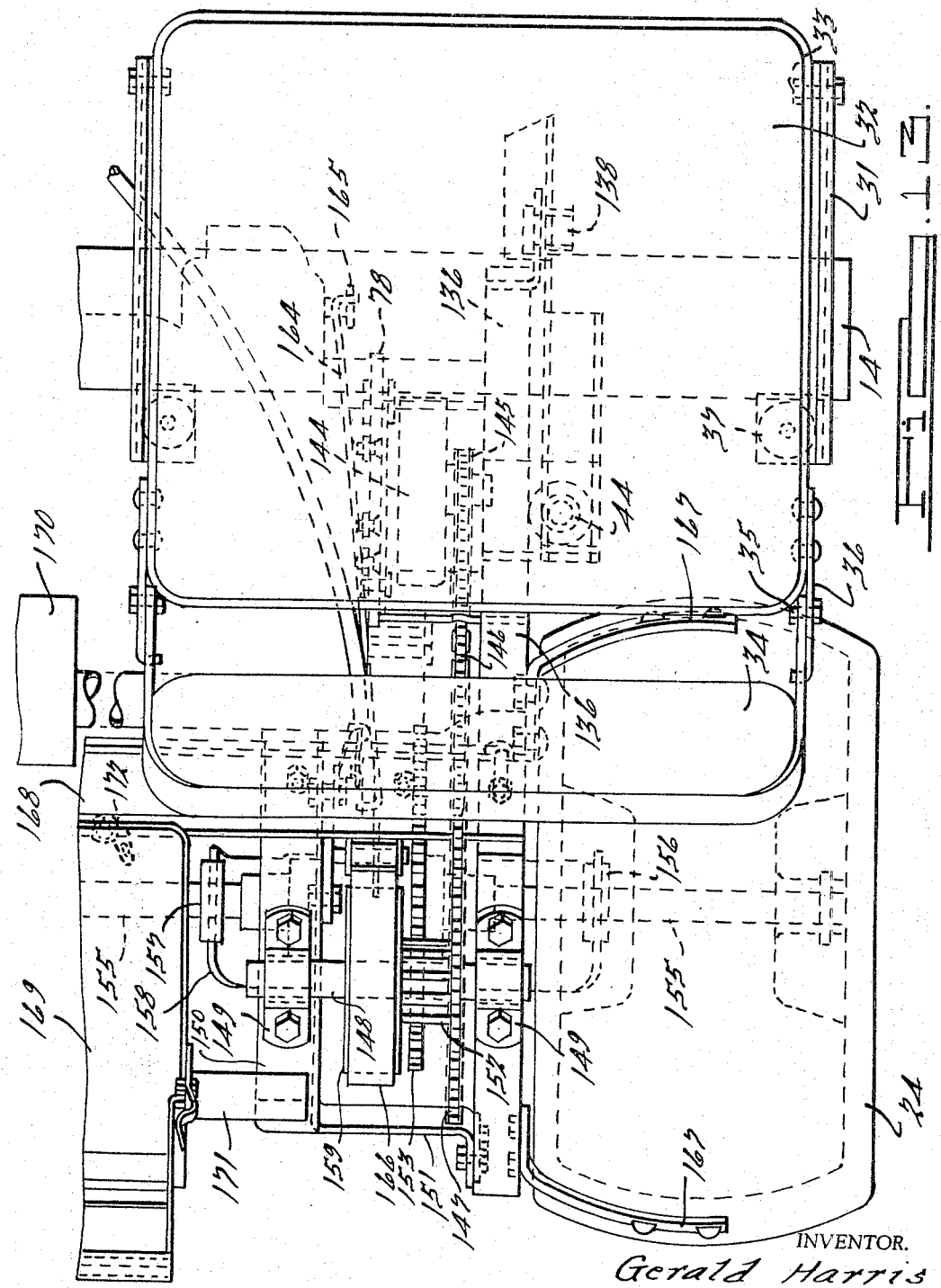

United States Patent Office 3,329,228
Patented July 4, 1967

3,329,228
FOLDABLE GASOLINE DRIVEN GOLF CART
Gerald Harris, 8015 Agnes, Detroit, Mich. 48214
Filed Oct. 11, 1965, Ser. No. 494,381
12 Claims. (Cl. 180—27)

This invention relates to motor propelled carts, and particularly to a motor driven cart which is foldable into a small package for storage and transportation.

Carts, such as those used on a golf course, have a body provided with two seats and supports for a pair of golf bags. Such carts are usually stored in a building at the golf club in which battery charging facilities are provided. This substantially limits the number of carts which are owned by members of or rented from the golf club.

The present invention pertains to a cart having the capacity of the carts now employed by golf clubs, which is foldable into a small compact package and made of light material so that it can be easily lifted into the trunk of in automobile. It is contemplated that such a package would not weigh more than 75 pounds or occupy space greater than approximately 20 x 20 x 30 inches because of the compact folding. A two-cycle engine is employed for driving the cart as it requires no oil in the crankcase which otherwise would leak therefrom when the cart is folded and stored in different positions. A pull cord, an inertia starter or the like is preferably employed for starting the engine although it is to be understood that an electric starter with a small battery could be provided without adding any substantial weight to the cart.

The cart preferably has three wheels, two of which are mounted on an axle which carries a support for the engine, the seats and the drive for the axle. A third wheel is connected to the frame by a slide bar which permits it to be moved against the axle in alignment with the pair of wheels thereon when in folded position.

The parts are preferably made from aluminum or other light material with the seats so mounted on the axle supports as to fold downwardly after which the feet supporting platform is folded backwardly thereagainst. The rear axle and wheels are so mounted relative to the drive as to be capable of being swung forwardly, counterclockwise, to be in substantial alignment with the front wheel after being slid rearwardly into compact relationship with the other parts of the cart. The cart is made of light material with a minimum number of parts to reduce its overall weight and upon the folding of the wheels, seats and feet supporting platform, a compact unit is provided which is readily handled by one person.

Accordingly, the main objects of the invention are to provide a gas driven golf cart which is light in weight and foldable into a small compact package; to construct a cart with a gas tank which supports an axle having a pair of wheels thereon, an engine, foldable seats, a feet supporting platform and a front steering wheel all of which is movable into a compact unit; to provide a gasoline tubular tank which supports a drive axle and wheels, a pair of seats, an engine, a front wheel and a feet supporting platform so arranged as to permit the axle and wheels to be swung forwardly away from springs secured to brackets on the tank; to construct a cart with a forwardly swingable axle having supports thereon for the engine which may be swung forwardly into compact relation with other elements of the cart; to provide a tubular element of a cart with supporting brackets for the cart components which provides strength thereto and forms the gas tank for the engine; and in general, to provide a light weight foldable cart which is simple in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken plan view of a foldable cart embodying features of the present invention;

FIGURE 2 is a broken view in side elevation of the cart illustrated in FIGURE 1;

FIGURE 3 is a large sectional view of the structure illustrated in FIGURE 1, taken on the line 3—3 thereof;

FIGURE 4 is a view of the structure illustrated in FIGURE 2 when in folded position;

FIGURE 5 is a broken sectional view of the structure illustrated in FIGURE 1, taken on the line 5—5 thereof;

FIGURE 6 is a sectional view of the structure illustrated in FIGURE 5, taken on the line 6—6 thereof;

FIGURE 7 is an enlarged broken view of the structure illustrated within the circle 7 of FIGURE 1;

FIGURE 8 is a sectional view of the structure illustrated in FIGURE 7, taken on the line 8—8 thereof;

FIGURE 9 is a sectional view of the structure illustrated in FIGURE 2, taken on the line 9—9 thereof;

FIGURE 10 is a sectional view of the structure illustrated in FIGURE 9, taken on the line 10—10 thereof;

FIGURE 11 is a view in elevation of a cart similar to that of the above figures showing another form thereof;

FIGURE 12 is a broken, enlarged view of the driven part of the cart illustrated in FIGURE 11; and FIGURE 13 is a broken plan view of the structure illustrated in FIGURE 12.

The cart of the present invention embodies a drive shaft 11 having a bearing 12 at each end with brackets 13 thereon which support a tubular tank 14 for the gasoline for the engine. Arms 15 are pivotally mounted on the bearing 12 which have bearing brackets 16 thereon which support bearing 17 and the driven wheel shaft 18. A sprocket 19 is secured to the shaft 18, driven by a chain 21 from a sprocket 22 on the drive shaft 11. Wheels 23 are mounted on the end of the shaft 18 and mudguards 24 are supported over the wheels by brackets 25 and 26 which are secured to the arms 15. When the cart is employed to carry golfers and their bags, a platform 27 is supported by the brackets 25 and brackets 28. A pair of straps 30 secure each bag to the platform and to the back of the seats, which have a supporting bracket 29 secured thereto. The tubular tank 14 supports pairs of brackets 31 on which a pair of seats 32 are secured by forward pivots 33. A seat back 34 is secured by pivots 35 to the rear end of the seats 32 limited in rearward movement by a stop 36. With this arrangement, the backs 34 will hinge upon the seats 32 and both may be hinged forwardly about the pivots 33 into folded position.

A pair of brackets 38 are secured to the tubular tank 14 having a recessed cup 44 in the outwardly extending side flange. A spring 39 is supported by a bolt 41 extending through a washer 42 secured to the arms 15. The arms 15 and springs 39 are moved from the brackets 38 when in folded position. When in operating position the arcuate head of the bolts 41 mate with recess in cups 44 and provide resilient support for the tank and seats on the driven axle supports. The lower ends of the bolts 41 move past the arms 15 when the spring 39 is compressed. Rubber blocks 37 on the brackets 31 provide resilient support at the rear bottom portion of the seats 32. A frontwardly extending frame element 45 is secured to the tubular tank 14 and reinforced by an angle-shaped brace element 46. A rectangular sleeve 47 is secured by bolts 48 to the frame element 45 and the brace element 46. A telescoping rectangular tubular element 49 is slidably disposed in the rectangular sleeve 47 for slidable movement therein. The top wall of the rectangular tubular element 49 is provided with apertures 51 into which a pin 52 projects to secure the tubular element 49 in extended position.

A foot supporting platform 53 has a pair of uprights 54 and 55 at the rear end. A second bracket 56, similar to the bracket 13, is welded to the tubular tank 14 having an angle member 57 welded thereto. The member 57 has a downwardly extending flange mated with the flange on the upright 55 to which it is pivotally secured by a bolt 58. An angle member 59 is welded to the angle-shaped frame member 45 to which an arm 61 is bolted. A plate 62 secured at right angles to the end of the arm 61 engages the upright 54 and is secured in pivoted relation together by a bolt 63, which is in aligned relation to the bolt 58 of the upright 55. A tube 64 forms the border support for pans 65 and 66 of the platform 53. The pans are spaced apart to form a center slot 67 which extends forwardly the spaced ends 68 of the tube 62. The ends 68 are bridged by a downwardly presented U-shaped plate 69 which rests upon the forward end of the telescoping tube 49. With this arrangement the platform is supported by the bolts 58 and 63 at the rear end and by the inverted U-shaped plate 69 at the forward end. By grasping the forward edge of the platform it can be raised and pivoted about the bolts 58 and 63 into folded position over the folded seats 52.

An angle-shaped plate 69 is welded to the frame element 45 and to the angle member 57. A mounting plate 71 is secured to the engine 72 by a plurality of bolts 73. A flange 74 on the mounting plate 71 is secured by rivets 75 to a spring strip 76. The ends of the spring strip 76 are secured by bolts 77 to the supporting plate 69. The flange 74 engages a resilient pad 78 which is in engagement with the supporting plate 69. A similar resilient pad 79 is mounted on the opposite side of the supporting plate 69 against which a plate 81 is clamped by a bolt 82. The ends of the plate 69 have slots 83 therein for the bolts 77 and a similar slot 84 at the center for the bolt 82. This permits the supporting plate 71 to be shifted on the plate 69 to change the tension on a drive chain 85 of the engine.

A drive shaft 86 from the engine drives through a centrifugal clutch 87 for driving a sprocket 88 which drives the chain 85. The chain extends over a sprocket 89 which is secured to the shaft 11. The shaft 11 supports a brake drum 91 having a band 92 secured thereabout, one end being fixed on a pin 93, the opposite end being secured to a pin 94, as illustrated in FIGURE 8. The pin 94 is secured to an arm 95 by a pivot 96 on which a bracket 97 is also pivoted. The bracket 97 has a finger 98 movable into engagement with the arm 95 to produce its movement. The pin 93 is supported on a bracket 99, which is secured to a plate 101 welded or otherwise secured to the tubular tank 14. An accelerator and brake pedal 103 are secured by a pivot 104 to spaced flanges 105 extending upwardly from the platform pan 66. The pedal 103 has an arm 106 engaged by the pivot 104 above the portion extending downwardly through a slot 107 in the platform. A spring 108 engaging the lower end of the arm 106 urges the pedal 103 counterclockwise while a Bowden wire 109 secured to the lower end of the arm 106 urges it clockwise when pulled. A sleeve 111 of the Bowden wire extends through an aperture 112 in the pan 66 and is secured in fixed position adjacent to the pivoted bracket 97 by a clamp 113 secured on the plate 101. The adjacent end of the Bowden wire 109 is adjustably secured to a finger 114 on the bracket 97. A rigid rod 115 has an end pivotally secured in an aperture in the bracket 97 and the opposite end secured to the operating arm of the carburetor 116 for the engine 72. When the accelerator brake pedal is moved clockwise, the Bowden wire moves the bracket 97 and the finger 98 to the left to thereby release the pin 94 and the brake band 92. At the same time the pulling on the rod 115 to the rear opens the carburetor an amount adjusted by the foot pedal to control the speed of operation of the engine and therefore the cart. When the pedal 103 is released, the spring 108 will move the foot pedal 103 counterclockwise thereby moving the arm 97 counterclockwise, moving the finger 98 against the arm 95, thereby advancing the pin 94 to the right and applying the brake band 92 to the drum 91. At the same time the rod 115 is moved forwardly to shut off the carburetor and permit the engine to operate at idling speed at which time the centrifugal clutch 87 will throw out and the engine will idle without driving the cart.

The rectangular tubular element 49 has its outer end welded to a sleeve 117 which abuts a plate 118 which is rotatable thereon. At each end of the sleeve 117 a flanged sleeve bearing 119 is mounted in fixed relation thereto. The sleeve bearing receives a tubular end 121 of a wheel supporting fork 122. The tubular end 121 has a through pin 123 against which one end of a spring 124 abuts. The opposite end of the spring abuts a bar 125 which is secured by bolts 126 to the plate 118 in fixed relation thereto. The bar 125 is mounted in diametrically disposed slots 127 in the tubular end 121 for limiting its upward and downward travel. The bar 125 has trunnions 128 at each end thereof. A clevis 129 has apertures in the end which receive the trunnions 128 in pivoted relation to the bar. The clevis has a tubular steering arm 131 welded or otherwise secured thereto, extending upwardly and rearwardly by which the front wheel 132 supported in the fork 122 is steered. When the wheel 132 meets rough terrain the shock thereof is taken up by the spring 124 due to the movement of the tubular end 121 in the sleeve bearings 119. When in folded position, the fork 122 has a curved flange 133 which hooks over the shaft 18 of the rear wheels 22 to lock the wheels and cart in folded position. When the cart is to be forward the seat backs 34 are folded upon the seats 32 and the seats and backs are then pivoted forwardly about the pivots 33. Thereafter the foot supporting pan 64 is pivoted upwardly over the folded seats and the driven axle 18 is swung forwardly beneath the engine 72. The bar 49 is released and slid rearwardly until the sleeve 117 strikes against the bushing 47. The fork 122 and wheel 132 are swung to a position 90° from the driving position so as to nest between the two rear wheels 23 with the handle 131 parallel to the tank 14, all in nested position as clearly illustrated in FIG. 4. A hook 133 on one arm of the fork 122 engages the axle 18 to retain the fork 122 in folded position as illustrated in FIG. 4. This produces a compact folding of the cart which may be lifted by a single person and placed in the trunk of a car or other storage place.

In FIGS. 11 to 13 a cart 135 is illustrated which is similar to the cart of FIGS. 1 to 10 with the exception that the engine and drive is mounted on frame elements 136 which support the driven axle 18. With this arrangement the same supporting plate 78 is provided for the motor 72. The plate 78 is supported upon a U-shaped frame 137 from the arm 136 which is pivoted by a shouldered bolt 138 to a supporting bracket 139 fixed to the tank 14. The engine is mounted for adjustment on the plate 78 by the bolt and slot connection 141. The engine 72 has a starter 142 thereon actuated by a starter handle 143. The engine drives through a centrifugal clutch 144 and drives a sprocket wheel 145 which is connected by a chain 146 to a sprocket wheel 147. The sprocket wheel 147 is mounted on a shaft 148 which rotates in bearings 149 secured to the arm 136 and to an outboard frame 150. The shaft has a pinion 152 thereon which drives a gear 153 and a differential housing 154 from which the shaft sections 155 extend. The shaft sections are supported on bearings 156 on outboard supports 158. The shaft 148 has a brake drum 159 thereon about which a band 161 is supported and actuated in the same manner as the brake band 92 on the drum 91 of the cart illustrated in FIGS. 1 to 10. A brake actuating lever 162 is operated by a Bowden wire 163 which in turn operates a rod 164 which actuates a lever 165 of the carburetor of the engine 72.

The wheel guards 24 are supported by a bracket 167 secured to the arms 136 in any suitable manner. The arms 136 are interconnected by an upwardly presenting channel member 168 to which an end of a bag-supporting receptacle 169 is secured, the opposite ends being supported by brackets 171. Straps supporting bracket 172 are mounted on a flange of the angle member 168. The rear wall 176 of the receptacle is mounted on pivots 173 so that when disposed in an outwardly position side flanges 175 on the element sidewall and limits the outward movement thereof. When moved inwardly, the pivoted wall 176 is engaged by latches 177 to retain the wall in inward position. In this arrangement both of the bags are supported behind the left-hand seat back to clear the countershaft 148.

In the present arrangement, the engine 72 and muffler 170 are mounted on the swingable supporting arms 136 along with the drive elements for the rear wheels. The forwardly extending arms 148 support downwardly extending arms 179 which support a transversely disposed tube 181 which has its ends flattened and bent downwardly to be engaged by the pivot 58 of the upstanding members 54 and 55 of the platform 64. The elements 178 and 179 support the sleeve 47 for the bar 49. Otherwise, the structure of the cart illustrated in FIGS. 11, 12 and 13 is substantially the same as that of FIGS. 1 to 10 inclusive.

What is claimed is:

1. In a foldable cart a tubular frame member forming a gas tank, bracket means on said tank, a pair of foldable seats on said bracket means, a foot-supporting platform pivoted on said bracket means, a pair of wheel-supporting arms supported on said bracket means for pivotal movement therebeneath, an engine on said bracket means, a shaft on said arms having wheels on the end driven by said engine, a sleeve on said bracket means having at least one flat side, a bar having at least one flat side mated with the flat side of the sleeve slidable therein, a turnable fork on the end of the bar, a wheel in said fork and steering means for said fork, said sleeve and bar being disposed between the rear wheels to have the fork and wheel thereof nest therebetween when the bar is moved rearwardly through said sleeve.

2. In a foldable cart a tubular frame member forming a gas tank, bracket means on said tank, a pair of foldable seats on said bracket means, a foot-supporting platform pivoted on said bracket means, a pair of wheel-supporting arms supported on said bracket means for pivotal movement therebeneath, an engine on said bracket means, a shaft on said arms having wheels on the end driven by said engine, a sleeve on said bracket means having at least one flat side, a bar having at least one flat side mated with the flat side of the sleeve slidable therein, a turnable fork on the end of the bar, a wheel in said fork and steering means for said fork, said sleeve and bar being disposed between the rear wheels to have the fork and wheel thereof nest therebetween when the bar is moved rearwardly through said sleeve, and latch means on the fork engageagle with the driven axle for locking the elements in nested position.

3. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, and driving means for said axle.

4. In a cart tubular element, bracket means on said element, a pair of seats pivoted on said bracket means and movable to a nested position, a foot platform pivoted on said bracket means and movable into a nested position over said nested seats, rearwardly extended arms pivoted on said bracket means for pivoting forwardly beneath said tubular element, an axle supported on said arms, and driving means for said axle, said driving means being an engine supported on said bracket means.

5. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, and driving means for said axle, said driving means being an engine supported on said arms.

6. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, driving means for said axle, a tubular sleeve supported on said bracket means substantially centrally of wheels on said driven axle, a rod slidable in said sleeve, a fork pivotally supported at the forward end of said rod, a wheel supported in said fork and steering means for said fork.

7. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, driving means for said axle, a tubular sleeve supported on said bracket means substantially centrally of wheels on said driven axle, a rod slidable in said sleeve, a fork pivotally supported at the forward end of said rod, a wheel supported in said fork and steering means for said fork, a member interconnecting said arms, and a supporting platform secured to said member.

8. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, driving means for said axle, a tubular sleeve supported on said bracket means substantially centrally of wheels on said driven axle, a rod slidable in said sleeve, a fork pivotally supported at the forward end of said rod, a wheel supported in said fork and steering means for said fork, a member interconnecting said arms, a supporting platform secured to said member, and strap supporting elements on at least one of said seats and on said member adjacent to said platform.

9. In a cart a tubular element, bracket means on said element, a pair of seats pivoted on said bracket means and movable to a nested position, a foot platform pivoted on said bracket means and movable into nested position over said nested seats, rearwardly extended arms pivoted on said bracket means for pivoting forwardly beneath said tubular element, an axle supported on said arms, and driving means for said axle, said tube being sealed to form a gas tank for an engine.

10. In a collapsible cart, a supporting frame embodying a tubular gas tank having a plurality of brackets thereon, a pair of seats having pivoted backs pivoted on pairs of said brackets for moving forwardly into nested position, a foot platform pivotally supported on a pair of brackets for folding movement over said nested seats, a pair of pivoted arms on said brackets extending rearwardly of said frame, a differential and a pair of axles supported on said arms, wheels on the ends of said axles, an engine for driving said differential, a turnable fork within a sleeve, a wheel in said fork, a handle for turning said fork, and means for supporting said turnable fork for movement toward said tank into nested relation with said platform.

11. In a collapsible cart, a supporting frame embodying a tubular gas tank having a plurality of brackets thereon, a pair of seats having pivoted backs pivoted on pairs of said brackets for moving forwardly into nested position, a foot platform pivotally supported on a pair of brackets for folding movement over said nested seats, a pair of pivoted arms on said brackets extending rearwardly of said frame, a differential and a pair of axles supported on said arms, wheels on the ends of said axles, an engine for driving said differential, a turnable fork within a sleeve, a wheel in said fork, a handle for turning said fork, means for supporting said turnable fork for movement toward said tank into nested relation with said platform, and means for swinging said arms forwardly beneath said tank in nested relation to said fork.

12. In a collapsible cart, a supporting frame embodying a tubular gas tank having a plurality of brackets thereon, a pair of seats having pivoted backs pivoted on pairs of said brackets for moving forwardly into nested position, a foot platform pivotally supported on a pair of brackets for folding movement over said nested seats, a pair of pivoted arms on said brackets extending rearwardly of said frame, a differential and a pair of axles supported on said arms, wheels on the ends of said axles, an engine for driving said differential, a turnable fork within a sleeve, a wheel in said fork, a handle for turning said fork, means for supporting said turnable fork for movement toward said tank into nested relation with said platform, means for swinging said arms forwardly beneath said tank in nested relation to said fork, and spring means carried by the arms which engage bracket of said frame to provide resilient support therefor.

References Cited

UNITED STATES PATENTS

| | | | |
|---|---|---|---|
| 3,004,619 | 10/1961 | Straussler | 180—27 |
| 3,190,676 | 6/1965 | Junge | 180—27 X |
| 3,229,782 | 1/1966 | Hilton | 180—26 |
| 3,254,734 | 6/1966 | Behrmann | 280—36 |
| 3,266,589 | 8/1966 | Harris | 180—27 |

KENNETH H. BETTS, *Primary Examiner.*